(12) United States Patent
Ito et al.

(10) Patent No.: US 8,916,295 B2
(45) Date of Patent: Dec. 23, 2014

(54) POSITIVE ELECTRODE ACTIVE MATERIAL FOR LITHIUM ION SECONDARY BATTERY

(75) Inventors: Atsushi Ito, Ebina (JP); Kenzo Oshihara, Yokohama (JP); Yasuhiko Ohsawa, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 14/003,347

(22) PCT Filed: Feb. 28, 2012

(86) PCT No.: PCT/JP2012/054947
§ 371 (c)(1),
(2), (4) Date: Sep. 5, 2013

(87) PCT Pub. No.: WO2012/121062
PCT Pub. Date: Sep. 13, 2012

(65) Prior Publication Data
US 2013/0337332 A1    Dec. 19, 2013

(30) Foreign Application Priority Data

Mar. 9, 2011 (JP) ................................. 2011-051227

(51) Int. Cl.
*H01M 4/13* (2010.01)
*H01M 4/505* (2010.01)
*H01M 4/525* (2010.01)

(52) U.S. Cl.
CPC ............ *H01M 4/505* (2013.01); *H01M 4/525* (2013.01); *Y02E 60/122* (2013.01)
USPC ................... 429/231.95; 429/231.3; 429/223; 429/224

(58) Field of Classification Search
USPC .......................... 429/231.95, 231.3, 223, 224
See application file for complete search history.

(56) References Cited

U.S. PATENT DOCUMENTS

| | | | |
|---|---|---|---|
| 7,368,071 | B2 | 5/2008 | Dahn et al. |
| 2003/0108793 | A1 | 6/2003 | Dahn et al. |
| 2006/0159994 | A1 | 7/2006 | Dahn et al. |
| 2010/0112448 | A1 | 5/2010 | Yu et al. |

FOREIGN PATENT DOCUMENTS

| | | |
|---|---|---|
| JP | 2004-538610 A | 12/2004 |
| JP | 2008-270201 A | 11/2008 |

OTHER PUBLICATIONS

Atsushi Ito et al., "Koyoryo Lithium Ion Denchi-yo Seikyoku Zairyo Li 2Mn03- LiM02 no Sosei to Denchi Tokusei", The Electrochemical Society of Japan Dai 77 Kai Taikai Koen Yokoshu, 2010, 1B22.
Taisei Inoue et al., "xLi2Mn03- (I-x) LiM02 Koyoryo Seikyoku Zairyo no Denki Kagaku Tokusei", The Electrochemical Society of Japan Dai 77 Kai Taikai Koen Yokoshu, 2010, 1B25.

(Continued)

*Primary Examiner* — Jane Rhee
(74) *Attorney, Agent, or Firm* — Foley & Lardner LLP

(57) ABSTRACT

The positive electrode active material includes a compound represented by the following composition formula:

$$[Li_{1.5}][Li_{0.5(1-x)}Mn_{1-x}M_{1.5x}]O_3$$

(wherein x satisfies $0.1 \leq x \leq 0.5$, and M is represented by $Ni_\alpha Co_\beta Mn_\gamma$ in which α, β and γ satisfy $0 < \alpha \leq 0.5$, $0 \leq \beta \leq 0.33$ and $0 < \gamma \leq 0.5$, respectively), wherein a half width of the peak of a (001) crystal plane of the compound measured by X-ray diffraction is in a range from 0.14 to 0.33 inclusive, and an average primary particle diameter of the compound is in a range from 0.03 μm to 0.4 μm inclusive.

3 Claims, 8 Drawing Sheets

(56) References Cited

OTHER PUBLICATIONS

Kazuhiro Yoshii et al., "Koyoryo Li2Mn03-Li (Co1/3Ni1/3Mn1/3) 02-kei Seikyoku Zairyo ni Kansuru Kenkyu I. Li Datsu Sonyuji no Kessho Kozo to Denshi Jotai no Henka", 50th Battery Symposium in Japan Koen Yokoshu, 2009, 1B16.

Naoaki Yabuuchi et al., "Koyoryo Li2Mn03-Li (Co1/3Ni1/3Mn1/3) 02-kei Seikyoku Zairyo ni Kansuru Kenkyu II. Seikyoku to Denkaieki Kaimen ni Okeru Sanka Kangen Hanno", 50th Battery Symposium in Japan Koen Yokoshu, 2009, 1B17.

POSITIVE ELECTRODE ACTIVE MATERIAL FOR LITHIUM ION SECONDARY BATTERY

TECHNICAL FIELD

The present invention relates to a positive electrode active material used for a lithium ion secondary battery suitable for a motor driving power source for a vehicle such as an electric vehicle and a hybrid electric vehicle.

BACKGROUND ART

Regulations for $CO_2$ emissions have been considered in recent years to deal with atmospheric pollution and global warming. Particularly in the automobile industry, reduction in $CO_2$ emissions is highly expected in association with the spread of hybrid electric vehicles and electric vehicles. As for motor driving power sources for these types of vehicles, development of high-performance secondary batteries is being carried out. In particular, since a large battery capacity and a high cycle property are required for such secondary batteries for driving motors, lithium ion secondary batteries having high theoretical energy are gaining increasing attention among other types of secondary batteries.

Lithium ion secondary batteries generally include: positive electrodes each containing a positive electrode active material applied to both surfaces of a positive electrode current collector by use of a binder, negative electrodes each containing a negative electrode active material applied to both surfaces of a negative electrode current collector by use of a binder, and electrolyte layers through which the positive electrodes and the negative electrodes are connected, wherein these elements are housed in battery cases.

The battery capacity and output performance of these types of lithium ion secondary batteries largely depend on the active materials selected for the positive electrodes and the negative electrodes. Among the active materials, solid solution materials in which $Li_2MnO_2$ and $LiMO_2$ (wherein M represents a transition metal element such as Ni and Co) are present in a solid solution state, have attracted attention as the positive electrode active materials in recent years because of their high theoretical capacity, thermal stability and cycle property.

For example, Patent Literature 1 discloses a cathode composition for a lithium ion battery that is a solid solution type material including an Li-$M^1$-Mn type composite oxide represented by a predetermined composition formula, and that is in the form of a single phase having an O3 crystal structure.

CITATION LIST

Patent Literature

Patent Literature 1: Japanese Patent Application National Publication No. 2004-538610

SUMMARY OF INVENTION

However, in the cathode composition described in Patent Literature 1, the crystal structure is not changed smoothly and sufficiently in association with Li separation caused around 4.5 V peculiar to the solid solution, even if the composition or the crystal structure are optimized. In other words, since such a cathode composition is not electrochemically activated, a sufficient reversible capacity (discharge capacity) with respect to a theoretical capacity calculated from the Li amount contained in active materials, can hardly be ensured.

The present invention has been accomplished in view of the conventional problem of lithium ion secondary batteries using solid solution type positive electrode active materials. An object of the present invention is to provide a positive electrode active material capable of easily changing a crystal structure in association with Li separation and ensuring a high reversible capacity. Another object of the present invention is to provide a lithium ion secondary battery containing such a positive electrode active material.

That is, the positive electrode active material for a lithium ion secondary battery according to the present invention includes a compound represented by the following composition formula:

$$[Li_{1.5}][Li_{0.5(1-x)}Mn_{1-x}M_{1.5x}]O_3$$

(wherein x satisfies $0.1 \leq x \leq 0.5$, and M is represented by $Ni_\alpha Co_\beta Mn_\gamma$ in which $\alpha$, $\beta$ and $\gamma$ satisfy $0 < \alpha \leq 0.5$, $0 \leq \beta \leq 0.33$ and $0 < \gamma \leq 0.5$, respectively), wherein a half width of the peak of a (001) crystal plane of the compound measured by X-ray diffraction is in a range from 0.14 to 0.33 inclusive, and an average primary particle diameter of the compound is in a range from 0.03 μm to 0.4 μm inclusive.

The lithium ion secondary battery according to the present invention contains the positive electrode active material for a lithium ion secondary battery.

DESCRIPTION OF EMBODIMENTS

Hereinafter, a positive electrode active material for a lithium ion secondary battery, and a lithium ion secondary battery using the positive electrode active material will be explained in detail. It should be noted that the symbol "%" represents a percentage by mass unless otherwise specified, and dimensional ratios in the drawings are magnified for convenience of explanation and may be different from actual ratios.

A positive electrode active material 1 for a lithium ion secondary battery contains a compound that can absorb lithium ions at the time of discharging and release lithium ions at the time of charging. In other words, the positive electrode active material 1 is made from a solid solution type material, has a half width of the peak of a (001) crystal plane measured by X-ray diffraction in the range from 0.14 to 0.33, and has an average primary particle diameter in the range from 0.03 μm to 0.4 μm. The solid solution type material constituting the positive electrode active material 1 is represented by the predetermined composition formula $[Li_{1.5}][Li_{0.5(1-x)}Mn_{1-x}M_{1.5x}]O_3$ (wherein x satisfies $0.1 \leq x \leq 0.5$, and M is represented by $Ni_\alpha Co_\beta Mn_\gamma$ in which α, β and γ satisfy $0 < \alpha \leq 0.5$, $0 \leq \beta \leq 0.33$ and $0 < \gamma \leq 0.5$, respectively).

If there is no commercially available product of such a composite oxide, a material obtained by, for example, solid-phase synthesis and solution synthesis (such as a mixed hydroxide method and a composite carbonate method) may be used. Among these synthesis methods, the composite carbonate method is preferred. Since the material obtained by the composite carbonate method is an aqueous solution type and achieves a high yield, a uniform composition and easy composition control can be ensured. In addition, the material may be prepared by other common synthesis methods such as a coprecipitation method, a sol-gel method and a PVA method.

As described above, the element "x" in the composition formula representing the composite oxide is required to be set in the range from 0.1 to 0.5. If "x" is greater than 0.5, the discharge capacity of 200 mAh/g or higher cannot be ensured, and an advantage of the capacity over known layered positive electrode active materials cannot be gained sufficiently. If "x" is less than 0.1, the composition approximates $Li_2MnO_3$, and charging and discharging may not be carried out.

The element "M" in the composition formula represented by $Ni_\alpha Co_\beta Mn_\gamma$ is required to be set in a manner as to fulfill the conditions in which α is greater than 0 and 0.5 or less, β is in the range from 0 to 0.33, γ is greater than 0 and 0.5 or less, and α plus β plus γ equals one. That is, Ni is required to be in a divalent state in order that the positive electrode active material constituting the composite oxide can ensure a high capacity. When α is in the range described above, Ni causes a two-electron reaction ($Ni^{2+} \leftrightarrows Ni^{4+}$) in the divalent state. In addition, when trivalent Co is added, β is required to be in the range from 0 to 0.33 so that Ni causes the two-electron reaction in the divalent state. Further, when quadrivalent Mn is added, γ is required to be greater than 0 and 0.5 or less also so that Ni causes the two-electron reaction in the divalent state. Note that Co described above is added as necessary to increase material purity and improve electron conductivity.

The values of x, α, β and γ in the composition formula representing the composite oxide, preferably satisfy $0.1 \leq x \leq 0.25$, $0 < \alpha \leq 0.457$, $0 \leq \beta \leq 0.1$ and $0 < \gamma \leq 0.457$, respectively.

It may be preferable that the element "M" be a component represented by $Ni_\alpha Co_\beta Mn_\gamma M^1_\sigma$ (wherein α, β, γ and σ satisfy $0 < \alpha \leq 0.5$, $0 \leq \beta \leq 0.33$, $0 < \gamma \leq 0.5$ and $0 \leq \sigma \leq 0.1$, respectively, $\alpha+\beta+\gamma+\sigma=1$, and $M^1$ is at least one element selected from the group consisting of Al, Fe, Cu, Mg and Ti).

In this case, the values of α, β and γ may be adjusted in the above-described ranges, respectively, in view of the state where Ni causes the two-electron reaction in the divalent state.

The element "σ" preferably satisfies $0 \leq \sigma \leq 0.1$. If σ is greater than 0.1, the reversible capacity of the positive electrode active material may be decreased. With regard to the element selected for use in $M^1$, Al and Ti may be preferable. The elements of nickel (Ni), cobalt (Co) and manganese (Mn) are known for contributing to a higher capacity and a better output performance to increase material purity and improve electron conductivity. The elements of aluminum (Al), iron (Fe), copper (Cu), magnesium (Mg) and titanium (Ti) are known for contributing to a higher capacity and a better output performance to improve stability of crystal structures.

The positive electrode active material 1 for a lithium ion secondary battery according to the present invention is required to have a half width of the peak of a (001) crystal plane measured by X-ray diffraction that is in the range from 0.14 to 0.33. If the half width of the peak is less than 0.14, crystallinity is increased; however, the size of the primary particles is rapidly increased and as a result, the battery performance may be degraded. If the half width of the peak is greater than 0.33, the structural change at the time of initial charging causes structural damage because of low crystallinity, which may further cause a reduction in battery performance. The half width of the peak is more preferably in the range from 0.16 to 0.3 inclusive.

As the half width of the peak of the (001) crystal plane measured by X-ray diffraction is smaller, the crystallinity is higher. Here, as the baking temperature of a lithium-containing solid solution in a synthetic process is higher, or as the baking time in the process is longer, the crystallinity is higher. Namely, the half width of the peak can be decreased under such a condition. If the baking atmosphere is an inert atmosphere, the crystallinity is decreased and the half width tends to be increased.

Further, the positive electrode active material 1 for a lithium ion secondary battery according to the present invention is required to have an average primary particle diameter that is in the range from 0.03 μm to 0.4 μm. If the average primary particle diameter is smaller than 0.03 μm, structural damage is caused at the time of initial charging because of poor crystallinity and as a result, the battery performance may be degraded. If the average primary particle diameter is greater than 0.4 μm, the reaction of Li separation at the time of charging does not proceed to the inside of the particles, and the battery performance cannot be ensured sufficiently. The average primary particle diameter is more preferably smaller than or equal to 0.25 μm. Here, the primary particles represent particles constituting aggregates (secondary particles) observed with a scanning electron microscope (SEM) or a transmission electron microscope (TEM).

In the description of the present invention, "the particle diameter" represents the greatest length between any two points on the circumference of the active material particle observed by observation means such as SEM and TEM. In addition, "the average particle diameter" represents a value calculated with SEM or TEM as an average value of particle diameters of the particles observed in several to several tens of fields of view.

The primary particle diameter can be adjusted in the precursor preparation process and the baking process at the time of synthesis of the lithium-containing oxide solid solution. For example, when the synthesis of the precursor is carried out by the precipitation method in a liquid phase, the size of droplets of the solution (precipitation agent) is decreased to minimize the particles as a rate of stirring of the solution is increased.

In the baking process, the primary particle size can be increased as the baking temperature is higher, or as the baking time is longer. It should be noted that the particle diameter of the positive electrode active material is not particularly limited. In general, the particle diameter is preferably reduced as much as possible. However, the average particle diameter may be approximately in the range from 1 μm to 30 μm in view of operation efficiency and ease of handling. The average particle diameter is more preferably approximately in the range from 5 μm to 20 μm.

A lithium ion secondary battery 10 according to the present invention uses the positive electrode active material 1 including the solid solution type composite oxide having the composition, the crystal structure, the half width of the peak of the (011) crystal plane, and the primary particle diameter described above. Hereinafter, the positive electrode active material 1 for a lithium ion secondary battery and the lithium ion secondary battery 10 according to the embodiment of the present invention, are explained with reference to the drawings in terms of the constitutions and the materials thereof.

[Constitution of Lithium Ion Secondary Battery]

Figure 8:
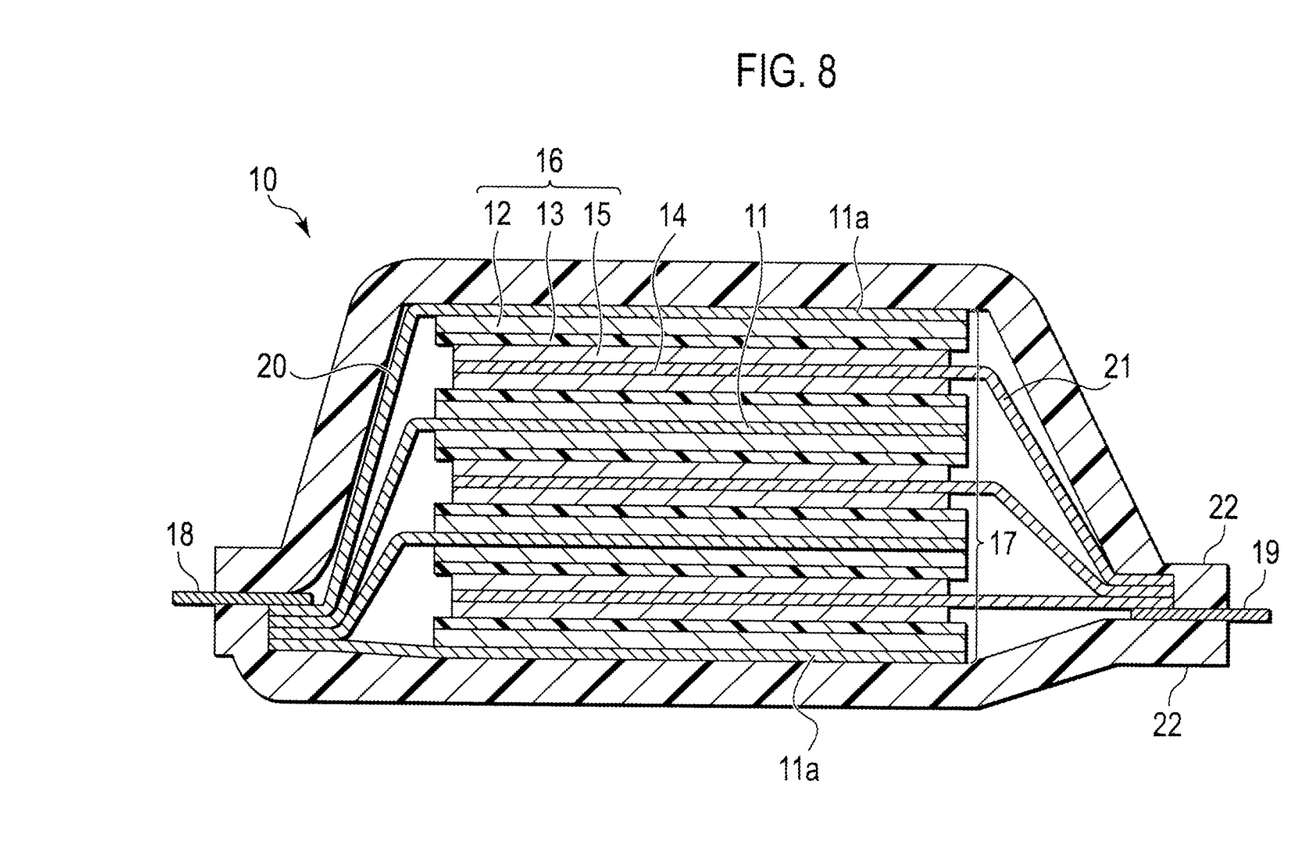
FIG. 8 is a schematic cross-sectional view of an example of a lithium ion secondary battery according to an embodiment of the present invention.

As illustrated in FIG. 8, the lithium ion secondary battery 10 includes a laminated film of a battery exterior member 22 combined with polymer-metal, which is thermally bonded along the edge thereof to house and seal a battery element 17 therein. The battery element 17 has a configuration in which positive electrode plates each including positive electrodes 12 provided on both sides of a positive electrode current collector 11, separator layers 13, and negative electrode plates each including negative electrodes 15 provided on both sides of a negative electrode current collector 14, are stacked on top of each other. Each of the lowermost layer and the uppermost layer of the battery element is provided with the positive electrode or the negative electrode only on one side of the current collector. A positive electrode tab 18 and a negative electrode tab 19 electrically connected to the positive electrode plates and the negative electrode plates, respectively, are attached to the positive electrode current collectors 11 and the negative electrode current collectors 14 of the respective electrode plates by ultrasonic welding or resistance welding via positive electrode terminal leads 20 and negative electrode terminal leads 21, respectively. These tabs are held by the thermally-bonded edge, and exposed on the outside of the battery exterior member 22.

The positive electrode 12, the separator layer 13 and the negative electrode 15 adjacent to each other constitute a single cell layer 16. That is, several sets of the positive electrode plate, the separator layer 13 and the negative electrode plate arranged in this order are stacked in a manner such that the positive electrode 12 on one side of the positive electrode plate faces the negative electrode 15 on one side of the negative electrode plate via the separator layer 13. Namely, the lithium ion secondary battery 10 according to the present embodiment includes the plural single cell layers 16 stacked on top of each other so as to be electrically connected in parallel. Here, outermost positive electrode current collectors 11a located on both outermost layers of the battery element 17 are each provided with the positive electrode 12 only on one side thereof. However, the arrangement of the positive electrode plates and the negative electrode plates shown in FIG. 8 may be changed. For example, both outermost layers of the battery element 17 may be provided with outermost negative electrode current collectors (not shown in the figure), each of which is provided with the negative electrode 15 only on one side thereof.

[Positive Electrode Tab and Negative Electrode Tab]

The positive electrode tab 18 and the negative electrode tab 19 are made from a material such as aluminum, copper, titanium, nickel, stainless steel (SUS), or an alloy thereof. However, the material is not limited to these, and may be any conventionally known material used for tabs for lithium ion secondary batteries.

The positive electrode tab 18 and the negative electrode tab 19 may be made from the same material, or may be made from different materials. The tabs may be prepared preliminarily and connected to the positive electrode current collectors and the negative electrode current collectors as described below according to the present embodiment. Alternatively, each of the positive electrode current collectors and the negative electrode current collectors may be extended to form the tabs as described below. These positive electrode tab 18 and negative electrode tab 19 could have the chances of any negative influence on surrounding products in a vehicle, particularly products such as electronic devices, if these tabs come into contact with peripheral devices or wires thereby causing a short circuit. In view of this, each part of the positive electrode tab 18 and the negative electrode tab 19 exposed on the outside of the battery exterior member 22 is preferably covered with, for example, a heat shrinkable tube having a heat resistant and insulating property (not shown in the figure).

In addition, current collecting plates may be used to extract a current outside of the battery. Such current collecting plates are electrically connected to the current collectors and leads, and exposed on the outside of the laminated sheet that is the battery exterior member 22. The material constituting the current collecting plates is not particularly limited, and may be a highly electrically conductive material conventionally used for current collecting plates for lithium ion secondary batteries. For example, the constituent material for the current collecting plates is preferably a metallic material such as aluminum, copper, titanium, nickel, stainless steel (SUS), or an alloy thereof, more preferably aluminum or copper in view of lightness, corrosion resistance and high electrical conductivity. The positive electrode current collecting plates and the negative electrode current collecting plates may be made from the same material, or may be made from different materials.

[Battery Exterior Member]

The battery exterior member 22 is preferably made from a film-like exterior material in view of, for example, reduction in size and weight. However, the battery exterior member 22 is not limited to such a material, and may be a conventionally known material used for exterior bodies for lithium ion secondary batteries. Namely, a metal can casing may be used.

In the case where the lithium ion secondary battery 10 according to the present invention is suitably used as a battery for large devices such as electric vehicles and hybrid electric vehicles, a polymer-metal composite laminated sheet having high thermal conductivity may be used, since the battery is required to have a high output power and heat releasing performance. In particular, an exterior body made from an exterior material such as a laminated film having a three-layer structure in which PP, aluminum and nylon are laminated in this order, may be used.

[Positive Electrode]

The positive electrodes used in the lithium ion secondary battery 10 according to the present invention are each formed in a manner such that a positive electrode active material layer is provided on one side or both sides of the current collector (the positive electrode current collector) made from an electric conductive material, such as an aluminum foil, a copper foil, a nickel foil and a stainless foil. The positive electrode active material layer contains the positive electrode active material 1 according to the present invention, and contains an electric conducting additive or a binder, as necessary.

The thickness of the current collectors is not particularly limited; however, it is preferably approximately in the range from 1 µm to 30 µm. The blending ratio of the positive electrode active material 1, the electric conducting additive and the binder in the positive electrode active material layer, is not particularly limited.

The lithium ion secondary battery 10 according to the present invention is only required to contain, as an essential component, the solid solution type positive electrode active material 1 according to the present invention represented by the composition formula $[Li_{1.5}][Li_{0.5(1-x)}Mn_{1-x}M_{1.5x}]O_3$. Namely, any other positive electrode active materials may be combined without any particular obstacle. Examples of the positive electrode active material include a lithium-transition metal composite oxide, a lithium-transition metal phosphate compound, a lithium-transition metal sulfated compound, a ternary system material, an NiMn system material, an NiCo system material and a spinel Mn system material. Examples of the lithium-transition metal composite oxide include $LiMn_2O_4$, $LiCoO_2$, $LiNiO_2$, $Li(Ni, Mn, Co)O_2$, $Li(Li, Ni, Mn, Co)O_2$, $LiFePO_4$, and an oxide in which part of the transition metal in each of these oxides is substituted with other elements. The ternary system material may be a nickel-cobalt-manganese type (composite) positive electrode material. The spinel Mn system material may be $LiMn_2O_4$. The NiMn system material may be $LiNi_{0.5}Mn_{1.5}O_4$. The NiCo system material may be $Li(NiCo)O_2$.

Some of the positive electrode active materials may be used together. Although the positive electrode active materials may require different particle diameters in order to achieve their own appropriate effects, it is not necessary to equalize the particle diameter of all of the active materials with each other, and the active materials having different particle diameters may be selected and mixed together so as to optimally function to achieve their own effects.

The binder is added to bind the active materials to each other or bind the active material to the current collectors to maintain the electrode structure. Examples of the binder include thermoplastic resin such as polyvinylidene fluoride (PVDF), polytetrafluoroethylene (PTFE), polyvinyl acetate, polyimide (PI), polyamide (PA), polyvinyl chloride (PVC), polymethyl acrylate (PMA), polymethyl methacrylate (PMMA), polyether nitrile (PEN), polyethylene (PE), polypropylene (PP) and polyacrylonitrile (PAN), thermoset resin such as epoxy resin, polyurethane resin and urea resin, and a rubber material such as styrene-butadiene rubber (SBR).

The electric conducting additive is also referred to as an electric conducting agent added to improve electric conductivity. The electric conducting additive used in the present invention is not particularly limited, and may be a conventionally known agent, for example, a carbon material such as carbon black (such as acetylene black), graphite and carbon fiber. The addition of the electric conducting additive contributes to improving the battery output performance and the battery reliability due to the improvement in retention of an electrolyte solution, since an electronic network is effectively established inside of the active material layer.

[Negative Electrode]

The negative electrodes each has, as in the case of the positive electrodes, a constitution in which a negative electrode active material layer is provided on one side or both sides of the current collector (the negative electrode current collector) made from the same electric conductive material as the positive electrode active material 1. The negative electrode active material layer contains the negative electrode active material, and contains the electric conducting additive or the binder as necessary as in the case of the positive electrode active material 1.

The negative electrode active material used in the lithium ion secondary battery 10 according to the present invention is not particularly limited as long as the active material can reversibly absorb and release lithium, and a conventionally known negative electrode active material may be used. Examples of the negative electrode active material include a carbon material such as graphite that is highly crystalline carbon (such as natural graphite and artificial graphite), low crystalline carbon (such as soft carbon and hard carbon), carbon black (such as Ketjenblack, acetylene black, channel black, lamp black, oil furnace black and thermal black), fullerene, carbon nanotube, carbon nanofiber, carbon nanohorn and carbon fibril, a single substance alloyed with lithium such as Si, Ge, Sn, Pb, Al, In, Zn, H, Ca, Sr, Ba, Ru, Rh, Ir, Pd, Pt, Ag, Au, Cd, Hg, Ga, Tl, C, N, Sb, Bi, O, S, Se, Te and Cl, an oxide containing the elements listed above (such as silicon monoxide (SiO), $SiO_x$ (0<x<2), tin dioxide ($SnO_2$), $SnO_x$ (0<x<2) and $SnSiO_3$) and carbide containing the elements listed above (such as silicon carbide (SiC)), a metallic material such as a lithium metal, and a lithium-transition metal composite oxide such as a lithium-titanium composite oxide (lithium titanate: $Li_4Ti_5O_{12}$). Each of these negative electrode active materials may be used singly, or two or more of these materials may be used together as a mixture.

As described above, the positive electrode active material layer and the negative electrode active material layer are each provided on one side or both sides of the respective current collectors. Alternatively, one current collector may be provided with the positive electrode active material layer on one side, and provided with the negative electrode active material layer on the other side. Electrodes having such a configuration are used for a bipolar battery.

[Electrolyte Layer]

An electrolyte layer contains a non-aqueous electrolyte. The non-aqueous electrolyte contained in the electrolyte layer functions as a carrier of lithium ions that move between the positive electrodes and the negative electrodes at the time of charging and discharging. The thickness of the electrolyte layer is preferably reduced as much as possible, and is generally approximately in the range from 1 µm to 100 µm, preferably in the range from 5 µm to 50 µm.

The non-aqueous electrolyte is not particularly limited as long as it functions as described above, and may be a liquid electrolyte or a polymer electrolyte.

The liquid electrolyte is in a state in which lithium salts (electrolyte salts) are dissolved in an organic solvent. The organic solvent may be carbonate such as ethylene carbonate (EC), propylene carbonate (PC), butylene carbonate (BC), vinylene carbonate (VC), dimethyl carbonate (DMC), diethyl carbonate (DEC), ethyl methyl carbonate (EMC) and methyl propyl carbonate (MPC). The lithium salts may be a compound that can be added to the electrode active material layers, such as $Li(CF_3SO_2)_2N$, $Li(C_2F_5SO_2)_2N$, $LiPF_6$, $LiBF_4$, $LiAsF_6$, $LiTaF_6$, $LiClO_4$ and $LiCF_3SO_3$.

The polymer electrolyte is divided into two types; a gel polymer electrolyte (a gel electrolyte) containing an electrolytic solution, and an intrinsic polymer electrolyte not containing an electrolytic solution. The gel polymer electrolyte is obtained in a manner such that the liquid electrolyte is poured into a matrix polymer (a host polymer) including an ion conductive polymer. The use of the gel polymer electrolyte has the advantage of being able to easily interrupt ion conduction between the respective layers, since there is no fluidity in the electrolyte.

The ion conductive polymer used as the matrix polymer (the host polymer) is not particularly limited. Examples of the polymer include polyethylene oxide (PEO), polypropylene oxide (PPO), polyvinylidene fluoride (PVDF), a copolymer of polyvinylidene fluoride and hexafluoropropylene (PVDF-HFP), polyethylene glycol (PEG), polyacrylonitrile (PAN), polymethyl methacrylate (PMMA), and a copolymer of these compounds. The ion conductive polymer may be either the same as or different from ion conductive polymer used as the electrolyte in the active material layers, but is preferably the same. The electrolytic solution (lithium salts and organic solvent) is not particularly limited, and may be the electrolyte salts such as lithium salts and the organic solvent such as carbonate as described above.

The intrinsic polymer electrolyte has constitution in which lithium salts are dissolved in the matrix polymer, but no organic solvent is contained. The use of the intrinsic polymer electrolyte contributes to improving the reliability of the battery, since the risk of liquid leakage from the battery is reduced.

The matrix polymer of the gel polymer electrolyte or the intrinsic polymer electrolyte can exhibit high mechanical strength when a cross-linked structure is formed. The cross-linked structure may be formed in a manner such that a polymerizable polymer used for polymer electrolyte formation (for example, PEO and PPO) is subjected to polymerization, such as thermal polymerization, ultraviolet polymerization, radiation polymerization and electron beam polymerization, by use of an appropriate polymerization initiator. The non-aqueous electrolyte contained in the electrolyte layers may be used singly, or two or more kinds thereof may be mixed.

A separator is used in the electrolyte layer when the electrolyte layer includes the liquid electrolyte or the gel polymer electrolyte. The specific configuration of the separator may be a microporous film made from polyolefin such as polyethylene and polypropylene.

[Battery Configuration]

The lithium ion secondary battery 10 has a structure in which the battery element is housed in a battery case such as a can body or a laminated container (a wrapping material). There are two main types of batteries: a wound type battery including a battery element in which positive electrodes, electrolyte layers and negative electrodes are wound, and a stacking type battery including a battery element in which positive electrodes, electrolyte layers and negative electrodes are stacked. The battery shown in FIG. 8 and the bipolar battery described above correspond to the stacking type battery. There are also so-called coin cells, button batteries and laminated batteries depending on shapes and structures of battery cases.

EXAMPLES

Hereinafter, the present invention is explained in detail with reference to examples; however, the present invention is not limited to those examples.

[1] Synthesis of Solid Solution Type Positive Electrode Active Material

A solid solution including a lithium-containing composite oxide was synthesized, as a positive electrode active material, by a composite carbonate method. First, three kinds of sulfate of Ni, Co and Mn were used as starting materials. In particular, $NiSO_4 \cdot 6H_2O$, $CoSO_4 \cdot 7H_2O$ and $MnSO_4 \cdot 5H_2O$ were used, weighed in a manner such that Ni, Co and Mn were set to a predetermined molar ratio, and dissolved in deionized water, so that a mixed aqueous solution at 2 M was obtained.

Next, ammonia water was dropped into the mixed aqueous solution so as to be pH 7. Further, a sodium carbonate aqueous solution was dropped thereto so that nickel-cobalt-manganese composite carbonate was precipitated. While the sodium carbonate aqueous solution was dropped, the solution was kept at pH 7 by use of the ammonia water. The composite carbonate thus obtained was filtrated under vacuum, and washed with water. The washed composite carbonate was dried and then baked at 700° C., so that a nickel-cobalt-manganese oxide was obtained.

The obtained composite oxide and lithium hydroxide were weighed in a manner as to contain 0 to 0.3% more lithium hydroxide than a predetermined molar ratio. The resultant material was pulverized and mixed, and then baked in air at 600 to 1000° C. for twelve hours, so that positive electrode active materials having each component composition as shown in Table 1 were synthesized. Then, a half width of the peak of a (011) crystal plane of each positive electrode active material thus obtained was calculated by X-ray diffraction, and an average primary particle diameter thereof was also measured by SEM observation. Table 1 shows the obtained results.

TABLE 1

| Classification | $[Li_{1.5}][Li_{0.5(1-x)}Mn_{1-x}M_{1.5x}]O_3$ M: $Ni_\alpha Co_\beta Mn_\gamma$ | | | | Baking Condition | | | Half Width of Peak of (001) Plane | Average Primary Particle Diameter (μm) | Discharge Capacity (mAh/g) |
|---|---|---|---|---|---|---|---|---|---|---|
| | x | α | β | γ | Temperature (° C.) | Time (h) | Atmosphere | | | |
| Example 1 | 0.10 | 0.417 | 0.166 | 0.417 | 900 | 12 | Air | 0.200 | 0.25 | 260 |
| Example 2 | .0.15 | 0.417 | 0.166 | 0.417 | 900 | 12 | Air | 0.212 | 0.21 | 310 |
| Example 3 | 0.20 | 0.417 | 0.166 | 0.417 | 900 | 12 | Air | 0.190 | 0.23 | 305 |
| Example 4 | 0.25 | 0.417 | 0.166 | 0.417 | 900 | 12 | Air | 0.211 | 0.19 | 300 |
| Example 5 | 0.30 | 0.417 | 0.166 | 0.417 | 900 | 12 | Air | 0.190 | 0.25 | 285 |
| Example 6 | 0.30 | 0.417 | 0.166 | 0.417 | 800 | 12 | Air | 0.270 | 0.19 | 260 |
| Example 7 | 0.30 | 0.417 | 0.166 | 0.417 | 700 | 12 | Air | 0.321 | 0.18 | 242 |
| Example 8 | 0.30 | 0.417 | 0.166 | 0.417 | 650 | 12 | Air | 0.329 | 0.18 | 235 |
| Example 9 | 0.30 | 0.458 | 0.084 | 0.458 | 1000 | 12 | Air | 0.200 | 0.20 | 272 |
| Comparative Example 1 | 0 | 0.417 | 0.166 | 0.417 | 900 | 12 | Air | 0.160 | 0.30 | 30 |
| Comparative Example 2 | 0.05 | 0.417 | 0.166 | 0.417 | 900 | 12 | Air | 0.170 | 0.30 | 150 |
| Comparative Example 3 | 0.30 | 0.417 | 0.166 | 0.417 | 1000 | 12 | Air | 0.130 | 1.40 | 210 |
| Comparative Example 4 | 0.30 | 0.417 | 0.166 | 0.417 | 600 | 12 | Air | 0.412 | 0.15 | 210 |

TABLE 1-continued

| | [Li$_{1.5}$][Li$_{0.5(1-x)}$Mn$_{1-x}$M$_{1.5x}$]O$_3$ | | | Baking Condition | | | Half Width of Peak of (001) Plane | Average Primary Particle Diameter (μm) | Discharge Capacity (mAh/g) |
| | M: Ni$_\alpha$Co$_\beta$Mn$_\gamma$ | | | Temperature (°C.) | Time (h) | | | | |
| Classification | x | α | β | γ | | | Atmosphere | | | |
|---|---|---|---|---|---|---|---|---|---|---|
| Comparative Example 5 | 0.30 | 0.417 | 0.166 | 0.417 | 600 | 12 | Air | 0.498 | 0.15 | 204 |
| Comparative Example 6 | 0.35 | 0.417 | 0.166 | 0.417 | 1000 | 12 | Air | 0.132 | 0.50 | 220 |
| Comparative Example 7 | 0.35 | 0.417 | 0.166 | 0.417 | 900 | 12 | Air | 0.136 | 1.00 | 220 |
| Comparative Example 8 | 0.40 | 0.417 | 0.166 | 0.417 | 900 | 12 | Air | 0.129 | 0.50 | 210 |
| Comparative Example 9 | 0.45 | 0.417 | 0.166 | 0.417 | 900 | 12 | Air | 0.126 | 0.50 | 195 |
| Comparative Example 10 | 0.30 | 0.458 | 0.084 | 0.458 | 1000 | 12 | Air | 0.200 | 0.50 | 220 |

[2] Electrode Preparation

Each positive electrode active material obtained as described above, acetylene black serving as an electric conducting additive, and polyvinyl fluoride (PVdF) serving as a binder were blended together in a manner so that the mass ratio was set to 85:10:5. Then, N-methylpyrolidone (NMP) was added as a solvent to the blended material to dilute it, so that positive electrode slurry was prepared for each example. The slurry thus obtained was applied to an Al foil as a positive electrode current collector in a manner such that the amount of the active material per unit area was approximately 10 mg, so that a positive electrode having a diameter of 15 mm was obtained. For a negative electrode active material, metal lithium was used.

[3] Battery Preparation

The positive electrode dried at 120° C. for four hours in a drying machine was placed to face a negative electrode containing metal lithium via two polypropylene porous membranes having a thickness of 20 μm, and these were placed on the bottom of a coin cell, to which a gasket was attached to keep the insulation state between the positive electrode and the negative electrode. Then, an electrolytic solution was poured into the coin cell by use of a syringe. A spring and a spacer were further stacked thereon, and an upper member was put and crimped on the coin cell, so that a lithium ion secondary battery was prepared. The electrolytic solution used was obtained in a manner such that LiPF$_6$ (lithium hexafluorophosphate) was dissolved at a 1 M concentration into a mixed non-aqueous solvent in which ethylene carbonate (EC) and diethyl carbonate (DEC) were mixed in a volume ratio of 1:2.

[4] Treatment Before Charging and Discharging

The batteries prepared as described above were each connected to a charging and discharging device. Then, constant current charging was carried out at a current rate of 1/12 C until a potential difference reached 4.5 V, and constant current discharging was further carried out until the potential difference reached 2.0 V. This process was repeated twice. The same process of the constant current charging and discharging was carried out while the potential difference was changed to 4.6 V, 4.7 V and 4.8 V, and the process at each potential difference was repeated twice. Table 2 shows the obtained results.

TABLE 2

| | | Voltage (V) | | Current | | | |
| Pattern | Condition | Lower Limit | Upper Limit | Rate (C) | Time (h) | Mode | Repeated Number |
|---|---|---|---|---|---|---|---|
| 1 | Charge | | 4.5 | 1/12 | 12 | CC | 2 |
| | Discharge | 2.0 | | | | | |
| 2 | Charge | | 4.6 | 1/12 | 12 | CC | 2 |
| | Discharge | 2.0 | | | | | |
| 3 | Charge | | 4.7 | 1/12 | 12 | CC | 2 |
| | Discharge | 2.0 | | | | | |
| 4 | Charge | | 4.8 | 1/12 | 12 | CC | 2 |
| | Discharge | 2.0 | | | | | |

[5] Measurement of Discharge Capacity

A discharge capacity of the respective batteries subjected to the preliminary treatment was measured by charging and discharging at a constant current rate (1/12 C) in a manner such that each battery was charged until the maximum voltage reached 4.8 V and further discharged until the minimum voltage reached 2.0 V. Table 1 also shows the results thus obtained.

Figure 1:
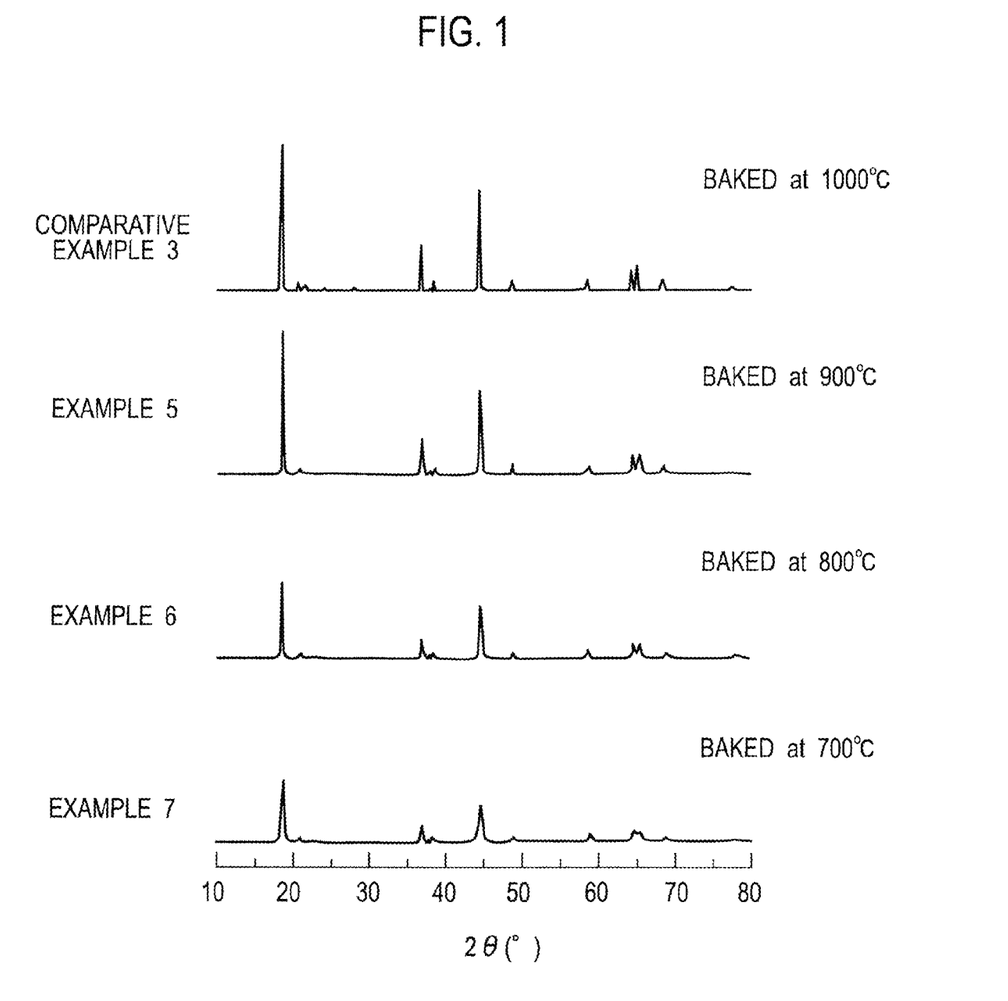
FIG. 1 is a graph showing a result of X-ray diffraction for solid solution type positive electrode active materials baked at each temperature.
Figure 2:
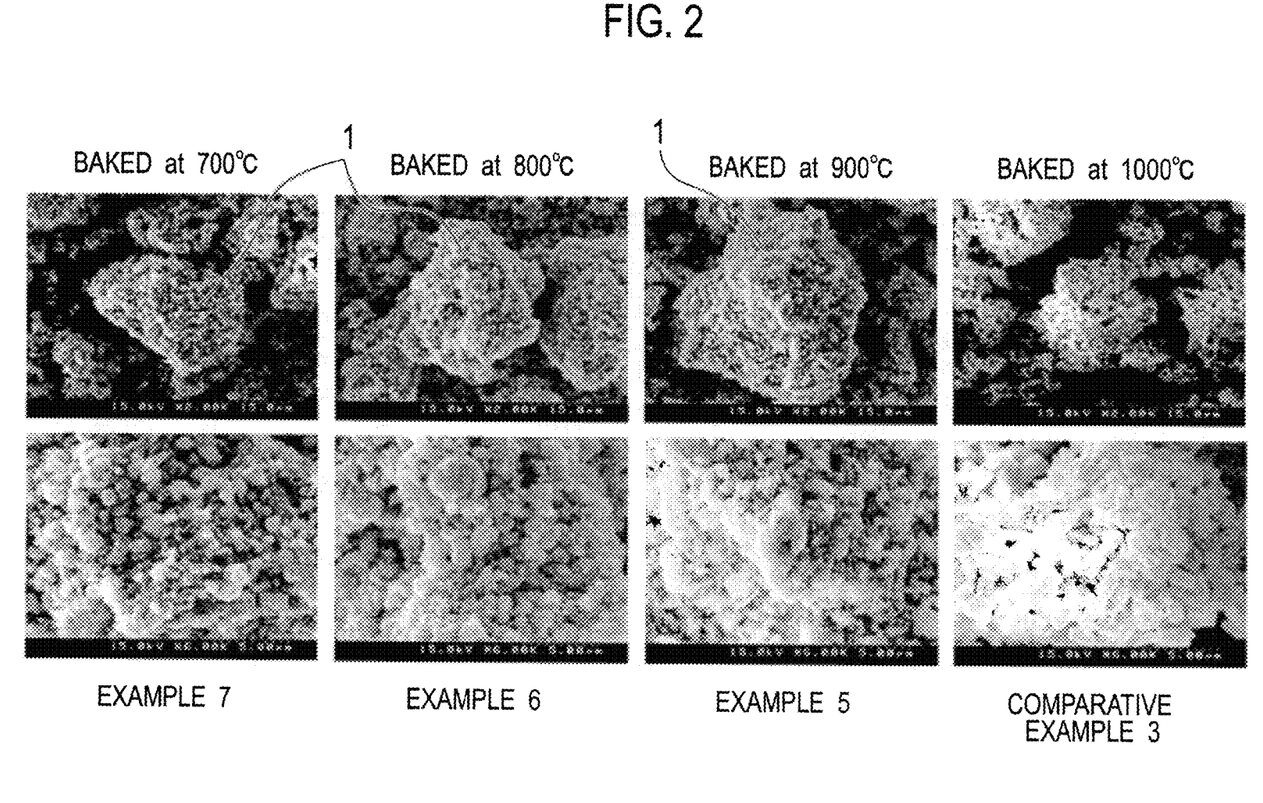
FIG. 2 shows scanning electron micrographs of solid solution type positive electrode active materials baked at each temperature.

FIG. 1 shows the results, as representative examples, of X-ray diffraction patterns of the solid solution type positive electrode active materials obtained in each example and comparative example, in which the positive electrode active materials having the same composition (x=0.30, α=0.417, β=0.166, γ=0.417) were baked at 700° C., 800° C., 900° C. and 1000° C., respectively. Note that the positive electrode active materials baked at 700° C., 800° C. and 900° C. correspond to the positive electrode active material 1 according to the present invention, and the positive electrode active material baked at 1000° C. corresponds to the comparative example. FIG. 2 shows images of the positive electrode active materials baked at each temperature taken by use of a scanning electron microscope (SEM).

As is apparent from the X-ray diffraction patterns shown in FIG. 1, the half width of the peak of the (001) crystal plane observed on the left in the figure (adjacent to 2θ=19°) was smaller as the baking temperature was higher (0.321→0.270→0.190→0.130). Namely, the results revealed that the crystallinity is higher as the baking temperature is higher. Further, the results of the SEM observation revealed that coarsening of the primary particles of the positive electrode active material 1 baked at 700° C., 800° C. and 900° C. was not observed (0.18 μm, 0.19 μm, 0.25 μm), while coarsening of the positive electrode active material baked at 1000° C. was observed (1.40 μm).

Figure 3:
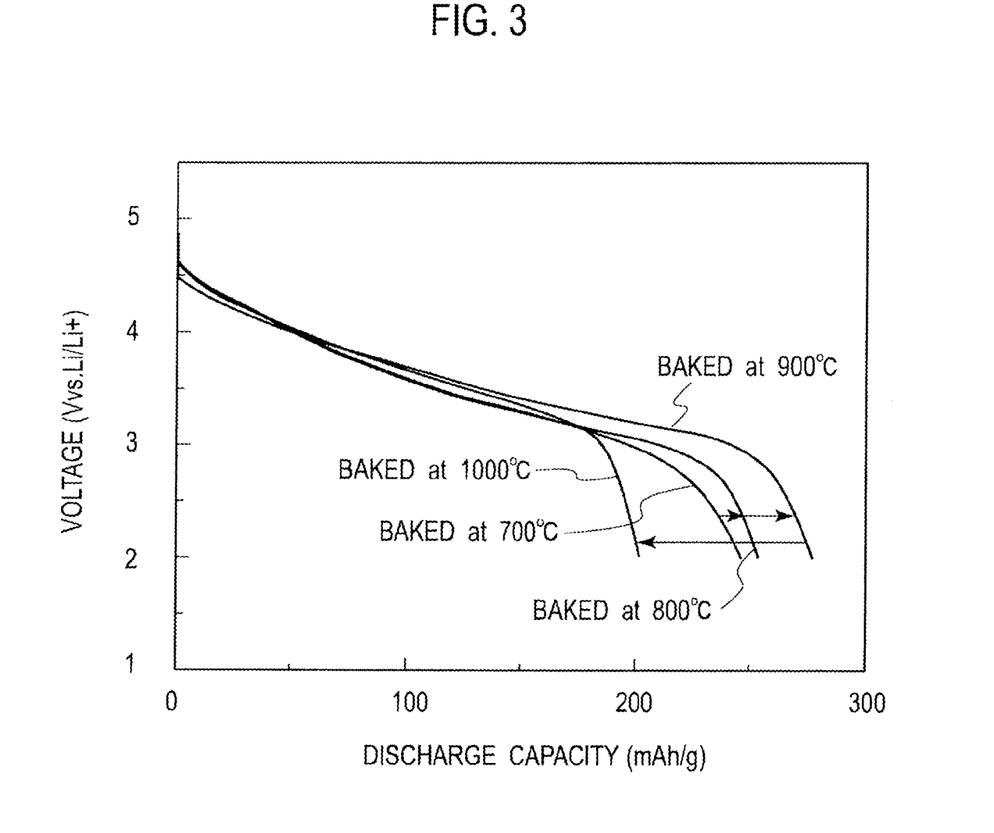
FIG. 3 is a graph showing discharge curves of a lithium ion secondary battery using solid solution type positive electrode active materials baked at each temperature.

FIG. 3 shows the results of the discharge test for the batteries using the positive electrode active materials described above. The results revealed that the capacity was increased as the baking temperature was higher in the range from 700° C. to 900° C., while the capacity of the product baked at 1000° C. tended to be decreased. According to these results, (1) the capacity was increased as the crystallinity was higher, and (2) the influence of the coarsening of the particle diameter on the capacity was significant compared to the influence of the crystallinity. Consequently, it was revealed that the determination of the primary particle diameter is important in addition to the crystal structure and composition in order to activate the solid solution type positive electrode active material and increase the capacity of the battery.

Figure 4:
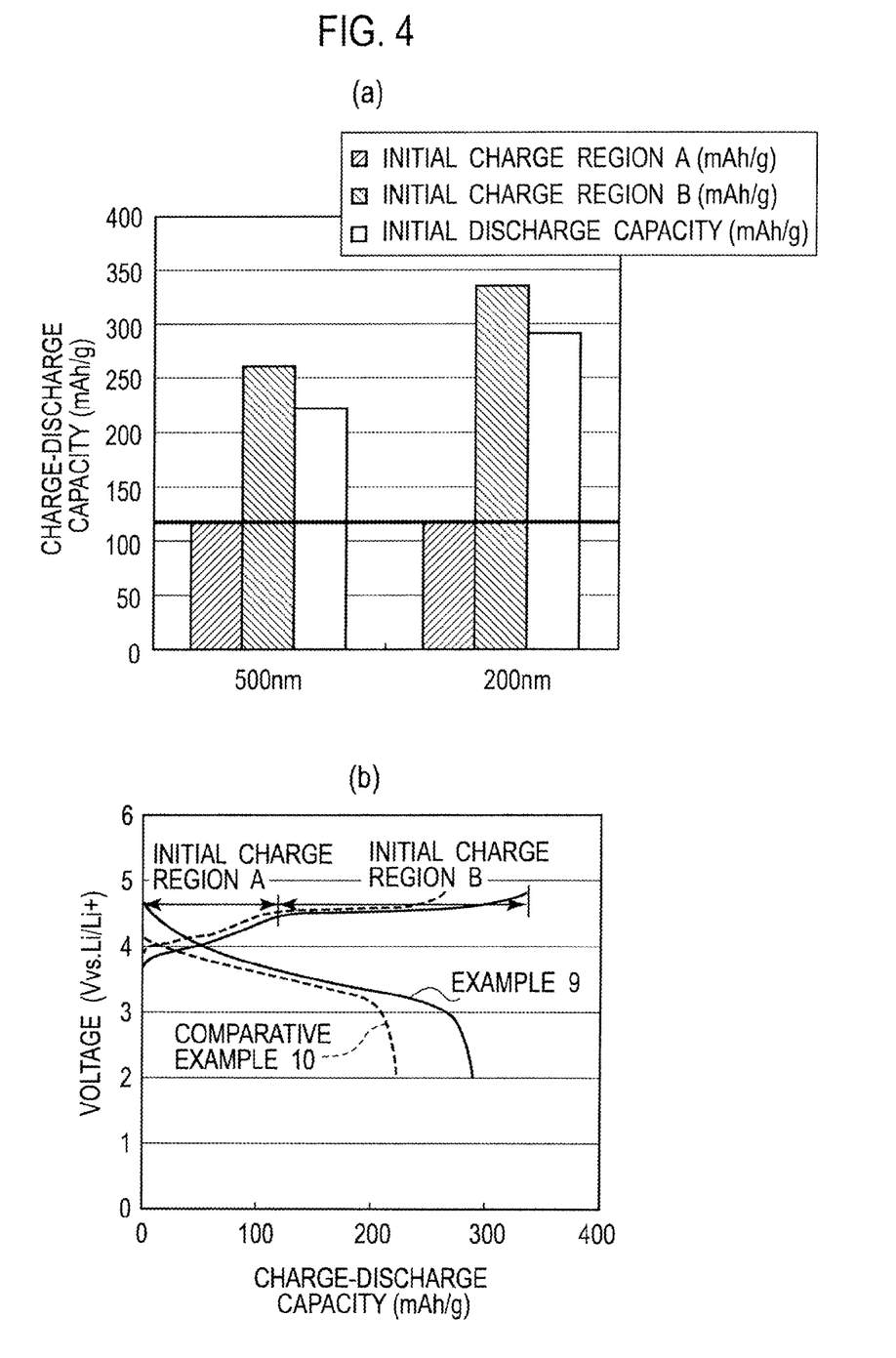
FIG. 4(a) is a graph showing a relationship between a charge-discharge capacity and an average primary particle diameter of a positive electrode active material.
FIG. 4(b) is a graph showing a relationship between a charge-discharge curve and an average primary particle diameter of a positive electrode active material.

Next, with regard to Example 9 and Comparative Example 10 each having the same composition of the positive electrode active material, baking temperature and half width of the peak of the (001) crystal plane but differing in average diameter of the primary particles (Example 9: 200 nm; Comparative Example 10: 500 nm), the charge-discharge capacity and the charge-discharge curve were compared. FIG. 4(a) and FIG. 4(b) show the respective results. As shown in FIG. 4(b), at the time of initial charging, initial charge region A in which a voltage gently increased and initial charge region B in which the voltage was then kept at a constant level and remained on a plateau, were observed. In initial charge region B, namely, in the region in which the voltage remained on a plateau, a change in crystal structure was observed.

As shown in FIG. 4(a), the capacity of Example 9 having a smaller primary particle diameter than Comparative Example 10 is greater in region B than that of Comparative Example 10. That is, the change in crystal structure may be caused more easily as the particles are smaller. In general, it is known that smaller particles and larger particles differ from each other in the ratio of surface area to volume or mass of the particles (specific surface area). Namely, since smaller particles tend to have a larger specific surface area than larger particles, the structural change possibly tends to proceed on the surface. In addition, if the particles become coarse, the structural change in the bulk does not easily proceed and as a result, the capacity may be decreased. On the other hand, as the particles are finer, the change in crystal structure is caused more easily. Accordingly, a higher capacity can be ensured. If the crystallinity is low at the time of the structural change, the crystal structure is damaged, and a sufficient capacity may not be obtained.

It was revealed that the solid solution type positive electrode active material is required to have a smaller particle diameter and have higher crystallinity in order to effectively utilize the capacity in the plateau region peculiar to the solid solution type positive electrode active material. In other words, it was revealed that the capacity obtained in initial charge region B, i.e. in the plateau region is larger as the particle diameter is smaller, which contributes to the later capacity.

Figure 5:
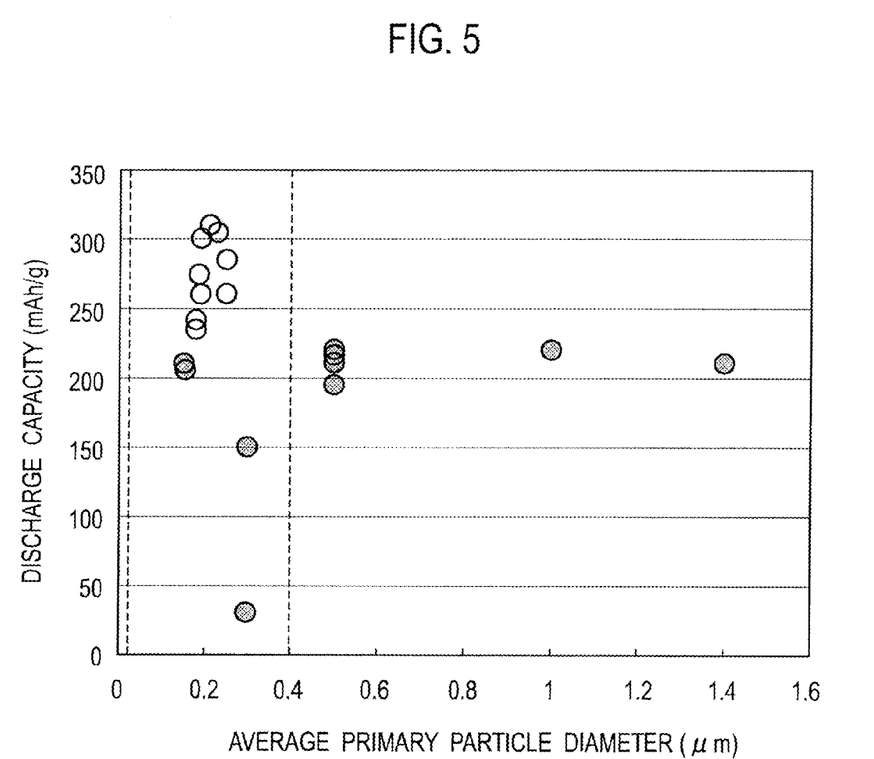
FIG. 5 is a graph showing a relationship between a discharge capacity of a lithium ion secondary battery and an average primary particle diameter of a positive electrode active material.
Figure 6:
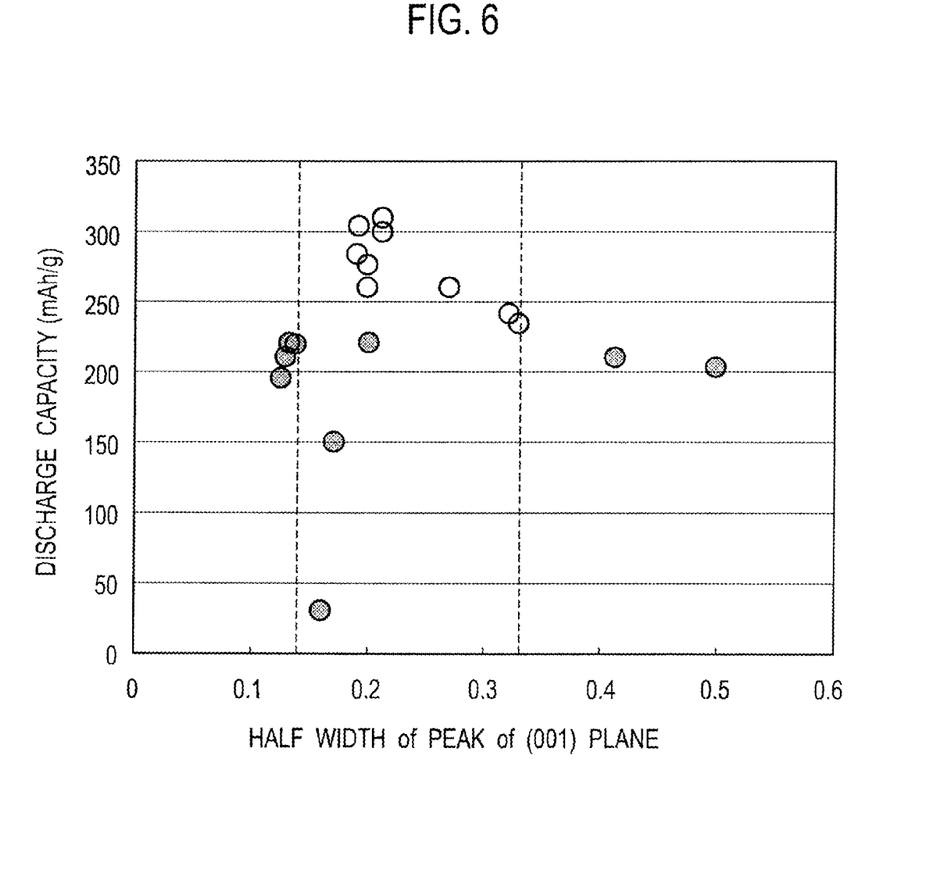
FIG. 6 is a graph showing a relationship between a discharge capacity of a lithium ion secondary battery and a half width of the peak of a (001) crystal plane of a positive electrode active material.
Figure 7:
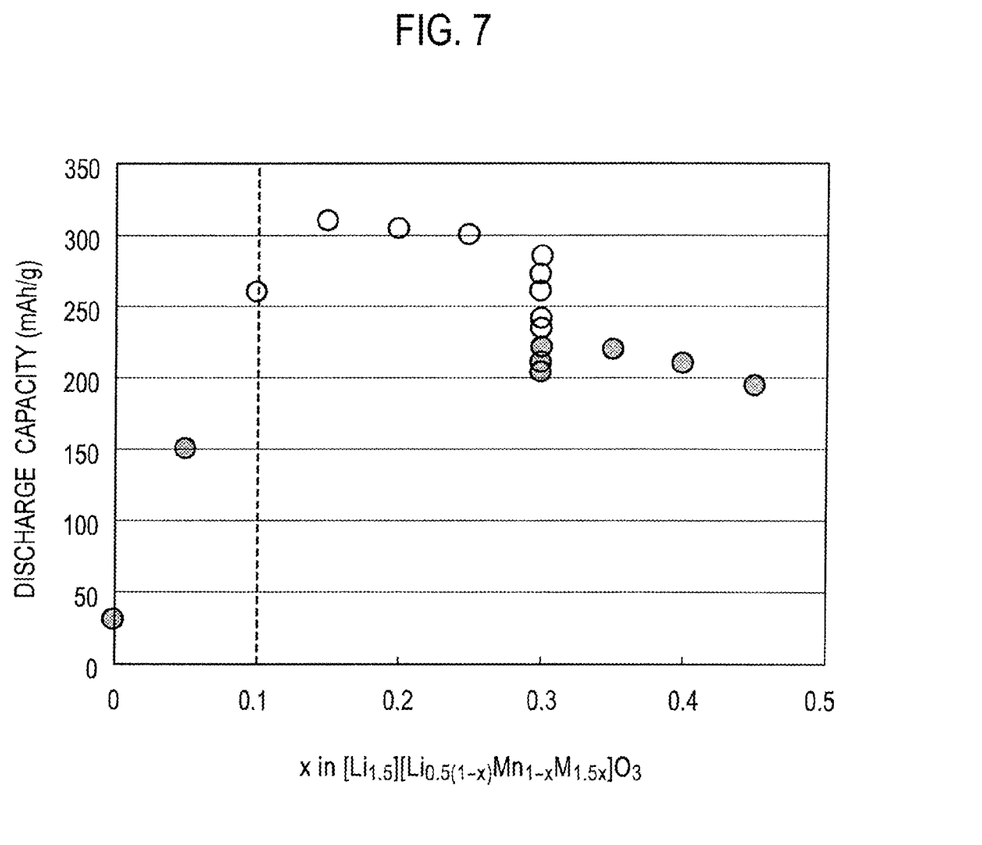
FIG. 7 is a graph showing a relationship between a discharge capacity of a lithium ion secondary battery and a composition (x value) of a positive electrode active material.

FIG. 5 to FIG. 7 show influences of the average primary particle diameter, the half width of the peak of the (001) crystal plane and the x value in the composition formula of the positive electrode active material on the discharge capacity, respectively. In the figures, the blank circles are plotted as the examples according to the present invention, and the black circles are plotted as the comparative examples. The batteries according to the examples (the blank circles) each have a value greater than 220 mAh/g, and show a higher capacity than the comparative examples. FIG. 5 and FIG. 6 show preferable numerical ranges of the average primary particle diameter of the positive electrode active material and the half width of the peak of the (001) crystal plane, respectively, each being defined by two vertical break lines. FIG. 7 shows a preferable numerical range of the x value ($0.1 \leq x \leq 0.5$) in the composition formula defined by a vertical break line. As is apparent from the figures, the battery having a high capacity was obtained by setting the average primary particle diameter in the range from 0.18 μm to 0.25 μm, by setting the half width of the peak of the (001) plane in the range from 0.190 to 0.329, and by setting the x value in the range from 0.10 to 0.30, in the positive electrode active material contained in the battery according to the present invention. Further, the battery having a higher capacity was obtained by setting the average primary particle diameter in the range from 0.19 μm to 0.25 μm, by setting the half width of the peak of the (001) plane in the range from 0.190 to 0.270, and by setting the x value in the range from 0.10 to 0.30. Although the comparative examples (the black circles) show some values on the abscissa that are included in the preferable numerical ranges according to the present invention in FIG. 5 to FIG. 7, other values of these comparative examples are excluded from the preferable numerical ranges according to the present invention. In addition, the batteries of these comparative examples had lower capacities than the batteries of the examples.

The entire content of Japanese Patent Application No. P2011-051227 (filed on Mar. 9, 2011) is herein incorporated by reference.

Although the present invention has been described above by reference to the embodiment and the examples, the present invention is not limited to the descriptions thereof, and it will be apparent to those skilled in the art that various modifications and improvements can be made.

INDUSTRIAL APPLICABILITY

In the present invention, the half width of the peak of the (001) crystal plane and the primary particle diameter are specified in addition to the crystal structure and the composition of the solid solution type positive electrode active material. This contributes to electrochemically activating the active material, and easily changing the crystal structure peculiar to the solid solution in association with Li separation caused around 4.5 V. Accordingly, the ratio of the reversible capacity to the theoretical capacity can be substantially increased.

REFERENCE SIGNS LIST

1 Positive electrode active material
10 Lithium ion secondary battery
11 Positive electrode current collector
11a Outermost layer positive electrode current collector
12 Positive electrode
13 Electrolyte layer
14 Negative electrode current collector
15 Negative electrode
16 Single cell layer
17 Battery element
18 Positive electrode tab
19 Negative electrode tab
20 Positive electrode terminal lead
21 Negative electrode terminal lead
22 Battery exterior member

The invention claimed is:
1. A positive electrode active material for a lithium ion secondary battery, comprising a compound represented by the following composition formula:

(wherein x satisfies $0.15 \leq x \leq 0.30$, and M is represented by $Ni_\alpha Co_\beta Mn_\gamma$ in which $\alpha$, $\beta$ and $\gamma$ satisfy $0 < \alpha \leq 0.5$, $0 \leq \beta \leq 0.33$ and $0 < \gamma \leq 0.5$, respectively), wherein a half width of a peak of a (001) crystal plane of the compound measured by X-ray diffraction is in a range from 0.19 to 0.212 inclusive, and an average primary particle diameter of the compound is in a range from 0.19 μm to 0.25 μm inclusive.

2. The positive electrode active material for a lithium ion secondary battery according to claim 1, wherein x in the composition formula satisfies $0.15 \leq x \leq 0.25$, and $\alpha$, $\beta$ and $\gamma$ satisfy $0 < \alpha \leq 0.457$, $0 \leq \beta \leq 0.1$ and $0 < \gamma \leq 0.457$, respectively.

3. A lithium ion secondary battery comprising the positive electrode active material according to claim 1.

* * * * *